(12) United States Patent
Wang et al.

(10) Patent No.: US 11,501,001 B2
(45) Date of Patent: *Nov. 15, 2022

(54) TECHNIQUES TO DETECT PERTURBATION ATTACKS WITH AN ACTOR-CRITIC FRAMEWORK

(71) Applicant: INTEL CORPORATION, Santa Clara, CA (US)

(72) Inventors: Shih-Han Wang, Portland, OR (US); Yonghong Huang, Portland, OR (US); Micah Sheller, Hillsboro, OR (US); Cory Cornelius, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 178 days.

This patent is subject to a terminal disclaimer.

(21) Appl. No.: 16/910,722

(22) Filed: Jun. 24, 2020

(65) Prior Publication Data

US 2020/0327238 A1  Oct. 15, 2020

Related U.S. Application Data

(63) Continuation of application No. 16/103,137, filed on Aug. 14, 2018, now Pat. No. 10,726,134.

(51) Int. Cl.
| | | |
|---|---|---|
| *G06F 21/57* | (2013.01) | |
| *G06N 5/04* | (2006.01) | |
| *G06F 21/56* | (2013.01) | |
| *G06N 20/00* | (2019.01) | |
| *G06N 3/08* | (2006.01) | |
| *G06F 21/55* | (2013.01) | |
| *G06N 3/00* | (2006.01) | |
| *G06N 3/04* | (2006.01) | |

(52) U.S. Cl.
CPC .......... *G06F 21/577* (2013.01); *G06F 21/552* (2013.01); *G06F 21/566* (2013.01); *G06N 3/006* (2013.01); *G06N 3/0454* (2013.01); *G06N 3/08* (2013.01); *G06N 5/043* (2013.01); *G06N 20/00* (2019.01); *G06F 2221/034* (2013.01)

(58) Field of Classification Search
CPC ............. G06F 2221/034; G06F 21/552; G06F 21/566; G06F 21/577; G06N 20/00; G06N 3/006; G06N 3/0454; G06N 3/08; G06N 5/043
See application file for complete search history.

(56) References Cited

U.S. PATENT DOCUMENTS

2019/0025917 A1* 1/2019 Francis ..................... A61F 2/68

OTHER PUBLICATIONS

Pattanaik et al., Robust Deep Reinforcement Learning with Adversarial Attacks, Dec. 2017.*

* cited by examiner

*Primary Examiner* — Minh Dinh
(74) *Attorney, Agent, or Firm* — Hanley, Flight & Zimmerman, LLC (57) ABSTRACT

Embodiments discussed herein may be generally directed to systems and techniques to generate a quality score based on an observation and an action caused by an actor agent during a testing phase. Embodiments also include determining a temporal difference between the quality score and a previous quality score based on a previous observation and a previous action, determining whether the temporal difference exceeds a threshold value, and generating an attack indication in response to determining the temporal difference exceeds the threshold value.

25 Claims, 7 Drawing Sheets

- CAUSE AN ACTION IN A PROCESSING ENVIRONMENT BASED ON AN OBSERVATION DURING A TESTING PHASE
  505

- GENERATE A QUALITY SCORE BASED ON THE OBSERVATION AND THE ACTION
  510

- DETERMINE A TEMPORAL DIFFERENCE BETWEEN THE QUALITY SCORE AND A PREVIOUS QUALITY SCORE
  515

- DETERMINE WHETHER THE TEMPORAL DIFFERENCE EXCEEDS A THRESHOLD VALUE
  520

- GENERATE AN ATTACK INDICATION IN RESPONSE TO DETERMINING THE TEMPORAL DIFFERENCE EXCEEDS THE THRESHOLD VALUE
  525

- PERMIT PROCESSING OF A NEXT OBSERVATION AND A NEXT ACTION IN RESPONSE TO DETERMINING THE TEMPORAL DIFFERENCE DOES NOT EXCEED THE THRESHOLD VALUE
  530

TECHNIQUES TO DETECT PERTURBATION ATTACKS WITH AN ACTOR-CRITIC FRAMEWORK

CROSS-REFERENCE TO RELATED APPLICATIONS

This application is a continuation of, claims the benefit of and priority to previously filed U.S. patent application Ser. No. 16/103,137 filed Aug. 14, 2018, entitled "TECHNIQUES TO DETECT PERTURBATION ATTACKS WITH AN ACTOR-CRITIC FRAMEWORK", which is hereby incorporated by reference in its entirety.

TECHNICAL FIELD

Embodiments described herein generally relate to reinforcement learning systems and techniques to detect perturbation attacks utilizing a trained critic agent during the testing phase.

BACKGROUND

Reinforcement Learning is goal-directed machine learning. An agent learns from direct interaction with its environment, without relying on explicit supervision and complete models of the environment. Reinforcement learning is a formal framework modeling the interaction between a learning agent and its environment in terms of states, actions and rewards. At each time step, an agent receives a state, selects an action following a policy, receives a scalar reward, and transitions to the next state. The agent's goal is to maximize an expected cumulative reward, e.g. the sum-total of each scalar reward received based on an action. The agent may receive a positive scalar reward for a positive action and a negative scalar reward for a negative action. Thus, the agent 'learns' by attempting to maximize the expected cumulative reward.

DETAILED DESCRIPTION

Embodiments discussed herein may generally be directed to systems and techniques to utilize an actor-critic framework to detect attacks on systems, such as those utilized for autonomous vehicles, robotics, drones, and so forth. More specifically, embodiments include providing reinforcement learning (RL) processing and to leverage the actor-critic framework to detect the attacks. An actor agent, of the agent-critic framework, learns from direct interaction with its environment, e.g., sensors and processing systems, without relying on explicit supervision and complete models of the environment. RL is a formal framework modeling the interaction between a learning agent and its environment in terms of states, actions, and rewards. At each time step, an actor agent receives a state, selects an action following a policy, receives a scalar reward, and transitions to the next state. The actor agent is a neural network that maps a policy for a state to an action. In embodiments, the actor agent may be implemented in hardware only, software only, and combination thereof. Embodiments also include a critic agent or a value function that provides a prediction of the future reward, measuring how good each state or state-action pair is. The critic agent may also be implemented in hardware only, software only, and combination thereof.

In embodiments, a system providing RL learns a policy that maps inputs from the environment to actions. However, these policies are vulnerable in adversarial environments. That is, an adversary can intentionally perturb the inputs to trick the policy into yielding an action of the adversary's choosing. In one example, a perturbation attack can cause the self-driving agent to crash causing an accident. Therefore, it is important to detect these perturbations in applications where they might cause a safety issue, e.g., autonomous vehicles.

In embodiments, the actor-critic framework is utilized for better performance and faster training convergence. In some embodiments, the actor agent and the critic agent may each be fully connected neural networks for better performance. However, embodiments are not limited in this manner, and the techniques discussed herein may be applied to any actor-critic framework to detect an attack. That is, embodiments are not restricted to the model architecture.

Generally, there are two phases for embodiments discussed herein, a training phase and a testing phase. In the training phase, the critic agent uses time-difference (TD) learning to improve itself, and the actor agent performs an action. Then the critic agent accesses how good the action and environment state or observation to compute a gradient for training the actor agent. In previous systems, the critic agent is typically not utilized during the testing phase. Only the well-trained actor would be used to take on input state to perform an action without using the critic.

However, embodiments include utilizing the critic agent in the Actor-Critic Framework (a state-of-the-art RL method) during the testing phase at test time (as opposed to at training time) to generate scores, which is the predicted reward, over time. Embodiments include computing the temporal difference of the scores to detect adversarial perturbations. Moreover, the critic agent, at test time, generate quality scores that enable detection of adversarial perturbations. This has three advantages contrasting to a traditional rule-based method and supervised learning method. First, human labeling is not needed for training the critic agent, so this attack detection method is unsupervised. Second, the critic agent is scalable to accept multiple high dimensional inputs from heterogeneous sensors. Third, the techniques discussed herein are more robust because the critic agent evaluates not only the sensor inputs but also the agent's actions (the policy). In this case, the subtle perturbation which is hard to detect from sensors can be detected from the actor agent's poor behavior.

Reference is now made to the drawings, wherein like reference numerals are used to refer to like elements throughout. In the following description, for purposes of explanation, numerous specific details are outlined in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

Figure 1:
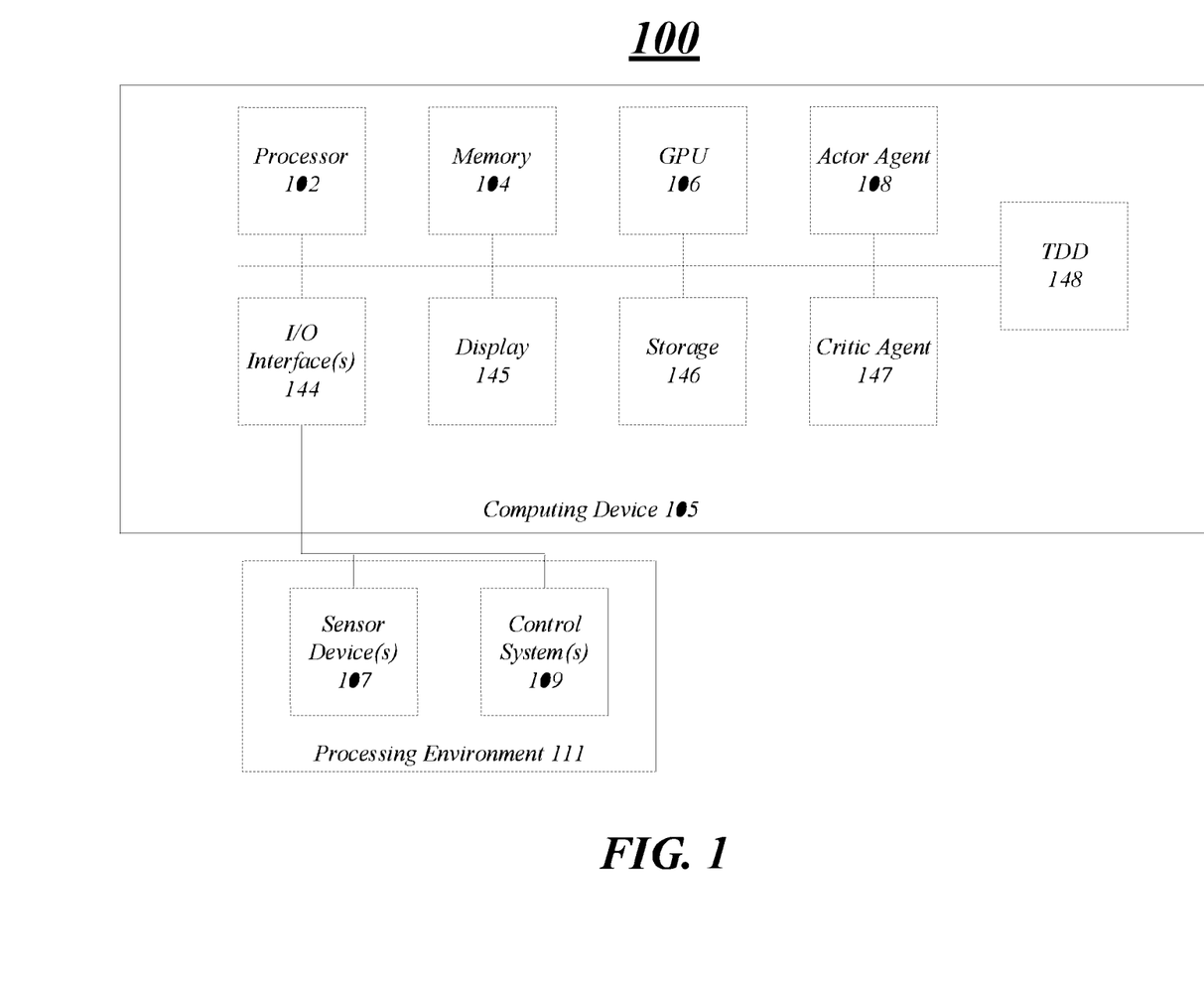
FIG. 1 illustrates an example embodiment of a system.

FIG. 1 illustrates one embodiment of a system 100. In various embodiments, system 100 may be representative of a system or architecture suitable for use with one or more embodiments described herein. More specifically, system 100 includes components, such as an actor-critic framework, to provide RL processing and to leverage the actor-critic framework to detect attacks.

As shown in FIG. 1, system 100 includes multiple elements. One or more elements may be implemented using one or more circuits, components, registers, processors, software subroutines, modules, or any combination thereof. Although FIG. 1 shows a limited number of elements in a certain topology by way of example; it can be appreciated that more or less elements in any suitable topology may be used in system 100 as desired for a given implementation. The embodiments are not limited in this context.

In various embodiments, system 100 may include a computing device 105 which may be any type of computer or processing device including a personal computer, desktop computer, tablet computer, netbook computer, notebook computer, laptop computer, server, server farm, blade server, or any other type of server, and so forth. In embodiments, the computing device 105 may be part of a autonomous vehicle system, a robot system, a drone system, and so forth.

In various embodiments, computing device 105 may include processor 102. Processor 102 may be implemented using any processor or logic device. The processor 102 may be one or more of any type of computational element, such as but not limited to, a microprocessor, a processor, central processing unit, digital signal processing unit, dual-core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processor 102 may be connected to and communicate with the other elements of the computing system via an interconnect, such as one or more buses, control lines, and data lines.

In one embodiment, computing device 105 may include memory 104 coupled to processor 102. Memory 104 may be coupled to processor 102 via and interconnect, or by a dedicated communications bus between processor 102 and memory 104, as desired for a given implementation. The memory unit 104 may be implemented using any machine-readable or computer-readable media capable of storing data, including both volatile and non-volatile memory. In some embodiments, the machine-readable or computer-readable medium may include a non-transitory medium. The embodiments are not limited in this context.

The computing device 105 may include a graphics processing unit (GPU) 106, in various embodiments. The GPU 106 may include any processing unit, logic or circuitry optimized to perform graphics-related operations as well as the video decoder engines and the frame correlation engines. The GPU 106 may be used to render 2-dimensional (2-D) and/or 3-dimensional (3-D) images for various applications such as video games, graphics, computer-aided design (CAD), simulation and visualization tools, imaging, etc. Various embodiments are not limited in this manner; GPU 106 may process any type of graphics data such as pictures, videos, programs, animation, 3D, 2D, objects images and so forth.

In various embodiments, computing device 105 may include a display 145. Display 145 may constitute any display device capable of displaying information received from processor circuit 102, and the GPU 106.

In various embodiments, computing device 105 may include storage 146. Storage 146 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 146 may include technology to increase the storage performance enhanced protection for valuable digital media when multiple hard drives are included, for example. Further examples of storage 746 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 105 may include one or more input/output (I/O) interfaces 144. Examples of I/O interface 144 may include Universal Serial Bus (USB) ports/adapters, IEEE 1374 Firewire ports/adapters, serial interfaces, parallel interfaces, High-Definition Multimedia Interface (HDMI) interface, a wired or wireless networking interface, and so forth. The embodiments are not limited in this context.

In embodiments, the computing device 105 may couple with one or more other environments and systems, such as processing environment 111, via the I/O interface 144. For example, the processing environment 111 may include one or more sensor devices 107. The one or more sensor devices 107 may be a device capable of measuring a characteristic or property of the environment and provides data to the computing device 105. Examples of a sensor device 107 include, but are not limited, a camera to generate image data, a laser range finder to generate range data, a radio detection and ranging (RADAR) device to generate RADAR data, a global positioning system (GPS) device to generate location data, an ultrasonic device to generate ultrasonic data, a sound detection and ranging (SONAR) device to generate SONAR data, an altimeter to generate altitude data, a gyroscope to generate orientation and velocity data, a tachymeter, and an accelerometer to determine acceleration data. Embodiments are not limited to these examples.

The sensor devices 107 provide data to the computing device 105, and the computing device 105 including the actor-critic framework may utilize the data to perform RL processing and attack detection. Moreover, the data may provide an observation for the processing environment 111 at any given point in time, e.g., the observation including the state of the processing environment 111 at the time a measurement is taken.

In embodiments, the computing device 105 includes an actor agent 108 and a critic agent 147 as part of the actor-critic framework. The actor agent 108 utilizes the data, e.g., an observation, and cause an action to be performed in the processing environment 111. For example, the actor agent 108 may communicate information via one or more I/O interfaces 144 to one or more control system(s) 109 to cause an action. In one example, the actor agent 108 may communicate an action or a set of instructions via an application programming interface (API) through one or more of the I/O interfaces 144 to a control system(s) 109. The action or set of instructions causes the control system(s)

109 to perform one or more tasks, e.g., causes a vehicle to brake, make a turn, accelerate, etc.

In embodiments, the actor agent 108 is a neural network that generates actions based on a policy and a state or observations of the processing environment. In one example, the policy may be a behavioral policy used to generate actions. A target policy may be evaluated and updated, e.g., low-variance gradient estimates may be utilized to determine an optimal policy. Moreover, the policy is a function that indicates the action to take in a certain state.

In embodiments, the actor agent 108 may function with the critic agent 147 during a training phase to determine an optimal policy for the processing environment 111. For example, the computing device 105 may be fed training data, e.g., a known set of sensor inputs, to train the actor agent 108 and the critic agent 147. The actor agent 108 may generate actions for the processing environment 111, and the processing environment 111 may provide observations and rewards. More specifically, the processing environment 111 may provide feedback (an observation) and a reward based on an action from the actor agent 108. The reward may be a scalar reward from the processing environment 111, which gives the actor agent 108 an indication of the quality of that action.

The critic agent 147 determines a prediction of a future reward based on the observation and reward from the processing environment 111. More specifically, the critic agent is a value function that measures how good each state or state-action pair is. The goal of the critic agent 147 is to find a policy that maximizes the total accumulated reward, also called the return. By following a given policy and processing the rewards, the critic agent 147 can build estimates of the return. In the training stage, the critic agent 147 may use temporal-difference (TD) learning to improve itself and the actor agent 108 performs an action. The critic agent 147 accesses how good the action and environment state to compute a gradient for training the actor agent 108, for example.

In embodiments, the actor agent 108 and the critic agent 147 may process data and information during a testing phase, e.g., receiving real-time/live data from the processing environment 111 and detecting attacks. The actor agent 108 may be used to generate actions for the processing environment 111 and receive observations and rewards from the processing environment 111. Also, the actor agent 108 may provide actions to the critic agent 147, which may be used by the critic agent 147 with the observations and rewards from the processing environment 111 to generate scores that may be used to detect adversarial attacks. One example of an attack that may be detected by system 100 discussed herein may be a Fast Gradient Sign Method (FGSM) attack. Another example may be a random attack. These types of attacks may be used to add a subtle value to modify the input features, e.g., attacking by perturbation. System 100 is to detect those attacks before an adverse event occurs, e.g., a self-driving car crashes. The different types of attacks are explained in more detail below.

Equation 1 illustrates Fast Gradient Sign: (1.)

$$\eta = \epsilon \operatorname{sign}\left(\frac{\Delta J(\theta, x, y)}{\Delta x}\right),$$

where $J(\theta, x, y)$ is the training cost of the neural network (actor-critic framework) with parameter $\theta$ and x to be the input to the model and y to be the associated label. $\epsilon$ is the parameter.

Equation 2 illustrates Random Attack:

$$\eta \sim \epsilon U(0,1), \quad (2.)$$

where $U(0,1)$ is a uniform distribution with a range of [0, 1] and $\epsilon$ is the parameter. Finally, both attack generate adversarial sample x' by perturbing original input x with perturbation $\delta$, as illustrated in equation 3.

$$x' = x + \delta \quad (3.)$$

In embodiments, the adversarial sample, x', is the sum over original sample x and the perturbation $\delta$. The actor agent 108 and critic agent 147 observes a sequence of feature vectors $\{x, x_2 \ldots\}$, $x \in R^d$ from the sensors 107. Perturbing the original feature vectors, an adversary can generate a sequence of perturbed samples, $\{x'_1, x'_2 \ldots\}$, $x' \in R^d$, to influence the for the actor-critic framework policy.

In embodiments, the critic agent 147 may detect these attacks by utilizing the sensor device's inputs and the actor agent's actions to generate a time sequence of quality scores. These quality scores are highly correlated with the attacks and can be detected using a temporal difference detector (TDD) 148. More specifically, the well-trained critic agent 147 will take on inputs from both environment state and action from the actor agent 108 to predict a score, $s_t \in$ Score, $t \in N$. The score is the quality of the observation-action pair while it was originally used to improve the training performance of the actor agent 108. The critic agent 147 further determines a sequence of quality scores, $\{s_1, s_2 \ldots\} \subset$ Score, where each score is determined and collected based on each action generated by the actor agent 108 and performed by the processing environment 111. If no attack happens, the actor agent 108 performs normal actions, and the critic agent 147 generates a sequence of stable scores with high values. On the other hand, if the actor agent 108 is attacked, its output action tends to be affected to produce poor action, which is detected by the critic agent 147. Further, the actions generated by the actor agent 108 worsen over time until the actor agent 108 causes a bad/negative event. In this case, the sequence of scores determined by the critic agent 147 have high fluctuation and then end up with a low score.

In embodiments, the computing device 105 including the TDD 148 receives each score, e.g., the sequence of the scores, generated from the critic agent 147 and is used to detect an attack. More specifically, the TDD 148 calculates the difference value of the score sequence between the current time step and the last time step, as illustrated by Equation 4.

$$d_t = |s_t - s_{t-1}|, \ s_t \in \text{Score}, \ t \in N. \quad (4.)$$

When $d_t$ is higher than (exceeds) a threshold value $\xi \in R$, an event may be detected as an attack by the TDD 148 and the system. The threshold value may be preset and determined before the testing phase. In one example, the threshold value may be based using training data sets with known attacks to determine the threshold value exceed when the attack occurs. In embodiments, the threshold value setting relies upon what range of scores the critic network evaluates the normal examples and the adversarial examples. For example, the range of scores can be determined during a training or warm-up process in which the system operates the actor agent and the critic agent inputting two cases, e.g., a normal case without an attack and adversarial case with attack, to measure the range of the scores from the critic agent. The system may then use the range of the evaluation scores to set the threshold value. If the maximum value of the normal case is not bigger than the mean value in the adversarial case, the system may set the threshold value to be the maximum value of the normal case. If the maximum value of the normal case is bigger than the mean value in the adversarial case, the system may set the threshold value to be lower which is in the range of mean value of the normal-case plus one to plus two standard deviation.

In embodiments, the TDD 148 may generate an attack indication in response to determining the temporal difference exceeds the threshold value. The attack indication may be one or more of an audio alert, a visual alert, and a haptic alert. The attack indication may also cause the system 100 to enter an emergency operating state. In the emergency operating state, the system 100 may shutdown and/or perform one or more actions to prevent the bad event from occurring, e.g., slow/stop an autonomous vehicle. In another example, the attack indication may require a user to interface with the system 100, e.g., provide an acknowledgment of the attack indication. Embodiments are not limited to these examples, and the system 100 may perform one or more other actions to mitigate and/or prevent a bad event from occurring.

In embodiments, the TDD 148 may permit processing of a next observation and a next action in response to determining the temporal difference does not exceed the threshold value. For example, the TDD 148 may permit the system 100 to continue to process observations and take actions based on the observations.

Figure 2A:
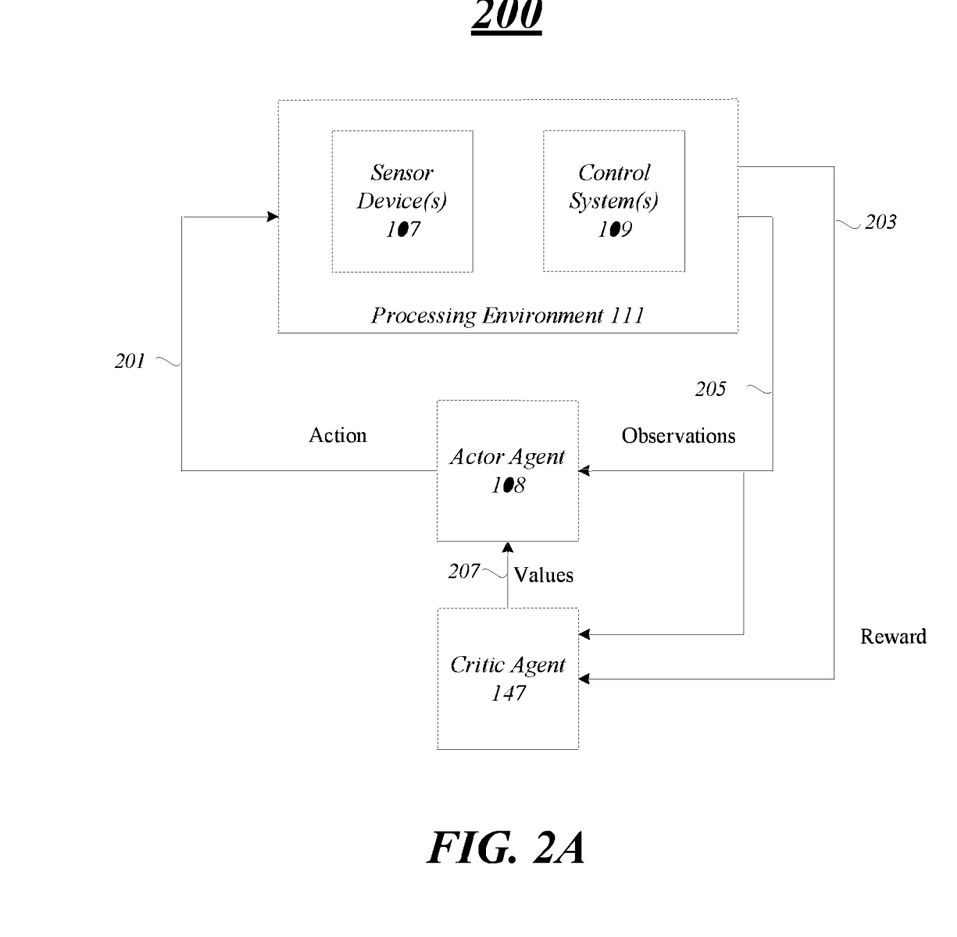
FIG. 2A illustrates an example embodiment of a first processing flow.

FIG. 2A illustrates a first processing flow 200 illustrating processes that may be performed by components of system 100 during a training phase of operation for the system 100. For example, FIG. 2A illustrates one or more operations that may be performed by the actor agent 108 and the critic agent 147 based on observations generated by the processing environment 111 including the sensor device(s) 107 and the control system(s) 109. In the training phase, the critic agent 147 uses time-difference (TD) learning to improve itself and the actor agent 108 performs an action. Then the critic agent 147 accesses how good the action and environment state or observation to compute a gradient for training the actor agent, for example.

At line 201, the actor agent 108 may cause an action to be performed by the processing environment 111, which may cause one or more control systems 109 to perform one or more instructions, for example. In embodiments, the processing environment 111 may generate observations, e.g., sensor data, and rewards based on the actions caused by the actor agent 108. In embodiments, the observations may be feedback to the actor agent 108 and to the critic agent 147 at line 205. Further and at line 203, the processing environment 111 may provide a reward to the critic agent 147. The reward may be a scalar reward from the processing environment 111, which gives the actor agent 108 and the critic agent 147 an indication of the quality of that action.

The critic agent 147 determines a prediction of a future reward based on the observation and reward from the processing environment 111. More specifically, the critic agent 147 provides a value function that measures how good each state or state-action pair is. The goal of the critic agent 147 is to find a policy that maximizes the total accumulated reward, also called the return. By following a given policy and processing the rewards, the critic agent 147 can build estimates of the return. In the training stage, the critic agent 147 may use temporal-difference (TD) learning to improve itself and the actor agent 108 performs an action. The critic agent 147 accesses the action and environment state to compute a gradient for training the actor agent 108, for example, and provide values that may be used by the actor agent 108 at line 207. The actor agent 108 may use the values to make adjustments and generate actions. In the training phase, the critic agent provides the gradient values calculated by itself to update the weights of the actor agent.

Figure 2B:
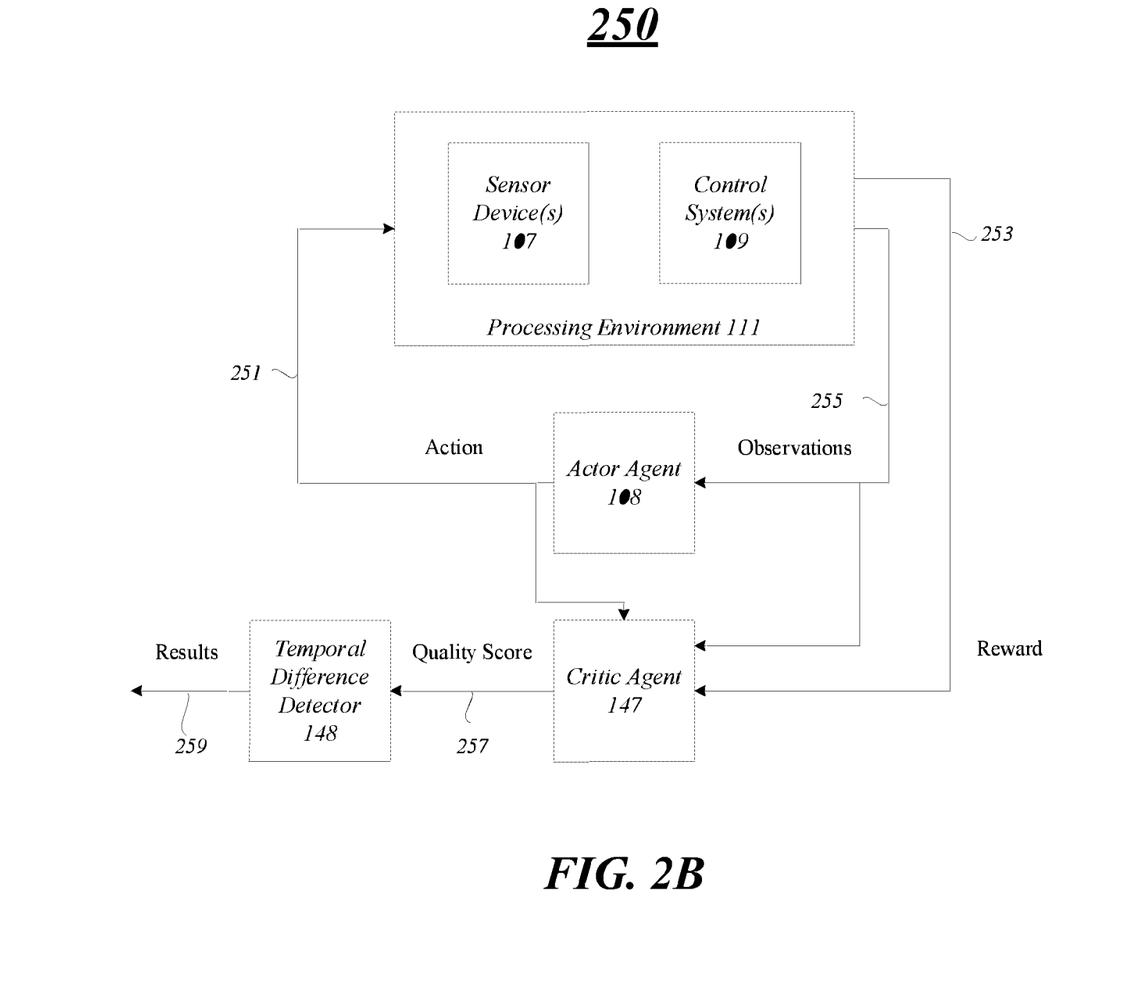
FIG. 2B illustrates an example embodiment of a second processing flow.

FIG. 2B illustrates a second processing flow 250 illustrating processes that may be performed by components of system 100 during a testing phase of operation for the system 100. For example, FIG. 2B illustrates one or more operations that may be performed by the actor agent 108, the critic agent 147, and the temporal difference detector (TDD) 148 based on observations generated by the processing environment 111 including the sensor device(s) 107 and the control system(s) 109.

As previously discussed, the actor agent 108 and the critic agent 147 may process data and information during the testing phase when receiving real-time/live data from the processing environment 111 and detect attacks. At line 251, the actor agent 108 may generate and provide actions for the processing environment 111 and the critic agent 147. An action may cause the processing environment 111 to perform one or more instructions, for example. Further and at line 255, the actor agent 108 and the critic agent 147 may receive observations from the processing environment 111, which may be based on an action performed by the processing environment 111. At line 253, the processing environment 111 may also provide rewards to the critic agent 147 based on the actions. In embodiments, the critic agent 147 may use the observations, actions, and rewards to generate a quality score that may be used to detect adversarial attacks.

In embodiments, the critic agent 147 utilize the information from the actor agent 108 and the processing environment 111 over a number of actions to generate a time sequence of quality scores at line 257. These quality scores are highly correlated with the attacks and can be detected using the TDD 148. More specifically, the well-trained critic agent 147 will take on inputs from both environment state and action from the actor agent 108 to predict a score, $s_t \in$ Score, $t \in N$. The quality score is the quality of the observation-action pair while it was originally used to improve the training performance of the actor agent 108. The critic agent 147 further determines a sequence of quality scores, $\{s_1, s_2 \ldots\} \subset$ Score, where each score is determined and collected based on each action generated by the actor agent 108 and performed by the processing environment 111. If no attack happens, the actor agent 108 performs normal actions, and the critic agent 147 generates a sequence of stable scores with high values. On the other hand, if the actor agent 108 is attacked, its output action tends to be affected to produce poor action, which is detected by the critic agent 147. Further, the actions generated by the actor agent 108 worsen over time until the actor agent 108 causes a bad/negative event. In this case, the sequence of scores determined by the critic agent 147 have high fluctuation and then end up with a low score.

In embodiments, the computing device 105 including the TDD 148 receives each score, e.g., the sequence of the scores, generated from the critic agent 147 and is used to detect an attack. More specifically, the TDD 148 calculates the difference value of the score sequence between the current time step and the last time step, and when the difference is higher than (exceeds) a threshold value SER, an event may be detected as an attack by the TDD 148. In embodiments, the TDD 148 may provide results at line 259. For example, the TDD 148 may generate an attack indication in response to determining the temporal difference exceeds (or meets) the threshold value. In another example, the TDD 148 may permit processing of a next observation and the next action in response to determining the temporal difference does not exceed the threshold value. For example, the TDD 148 may permit the system 100 to continue to process observations and take actions based on the observations. The system 100 may continue to process data and perform actions until an attack is detected and/or the system 100 finishes process, e.g., the vehicle reaches its' destination.

Figure 3:
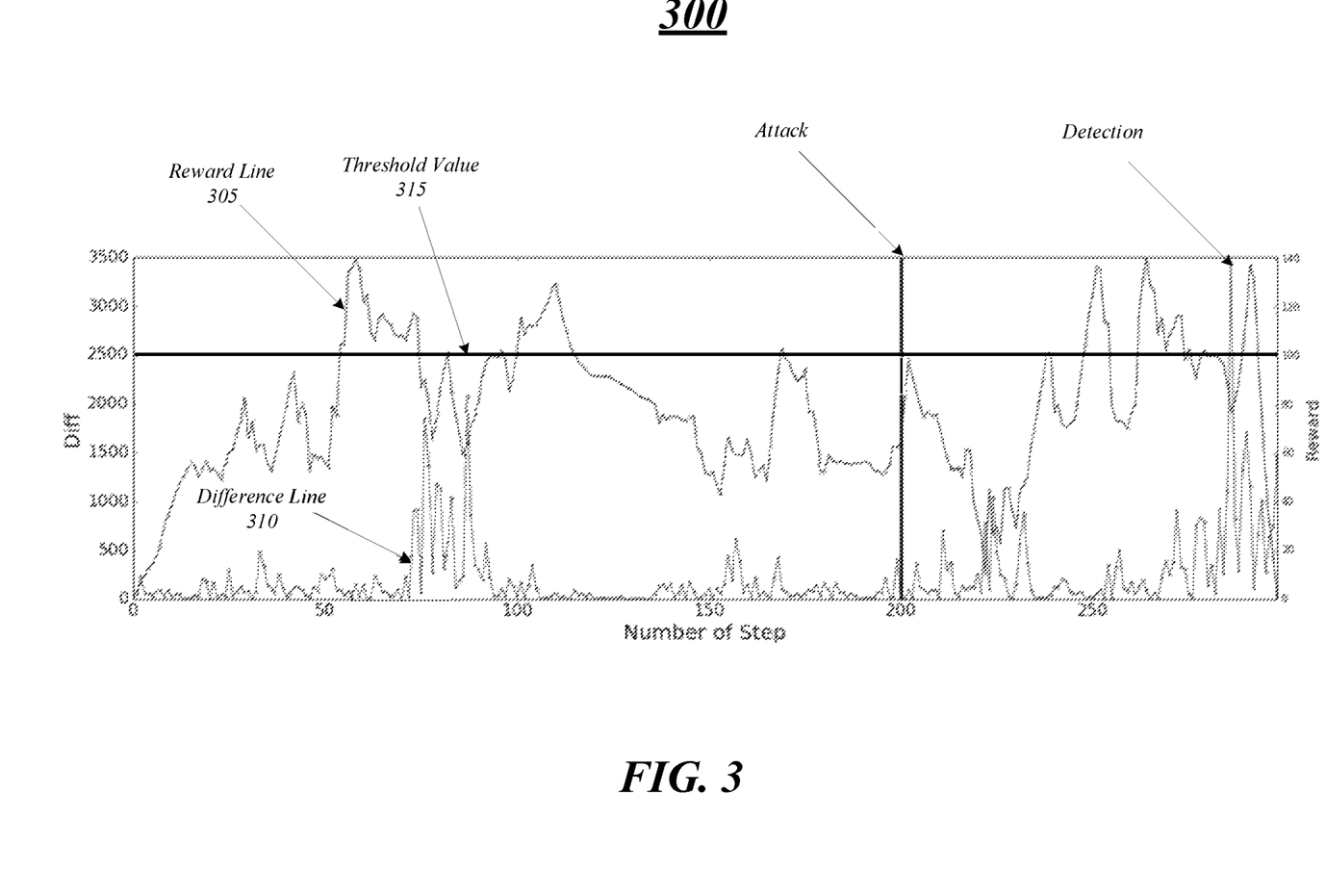
FIG. 3 illustrates an example of a detection diagram.

FIG. 3 illustrates detection scenario diagram 300 for an example FGSM attack with $\epsilon=0.005$ at the 200th step. The left y-axis is the detection score, and the right y-axis is the reward function of the actor agent. The x-axis is the time step, and the black bar line indicates the occurrence of the attack. The reward function can go up and down while the detection score, Diff. However, the detection score stays under certain low values and go up when the anomaly or attack occurs. By measuring the fluctuations in sequence values of detection score, the system can detect the attack above the threshold value 315. More specifically, diagram 300 includes a reward line 305 that illustrates rewards based on actions and a difference line 310 generated from a sequence of quality scores. As can be seen in diagram 300 an attack may occur, and a detection of the attack may be detected a number of steps after the attack based on the difference line 310 exceeding the threshold value 315. Note that the number of step is time step to represent a time unit about 0.2 seconds on TORCS simulator.

Figure 4:
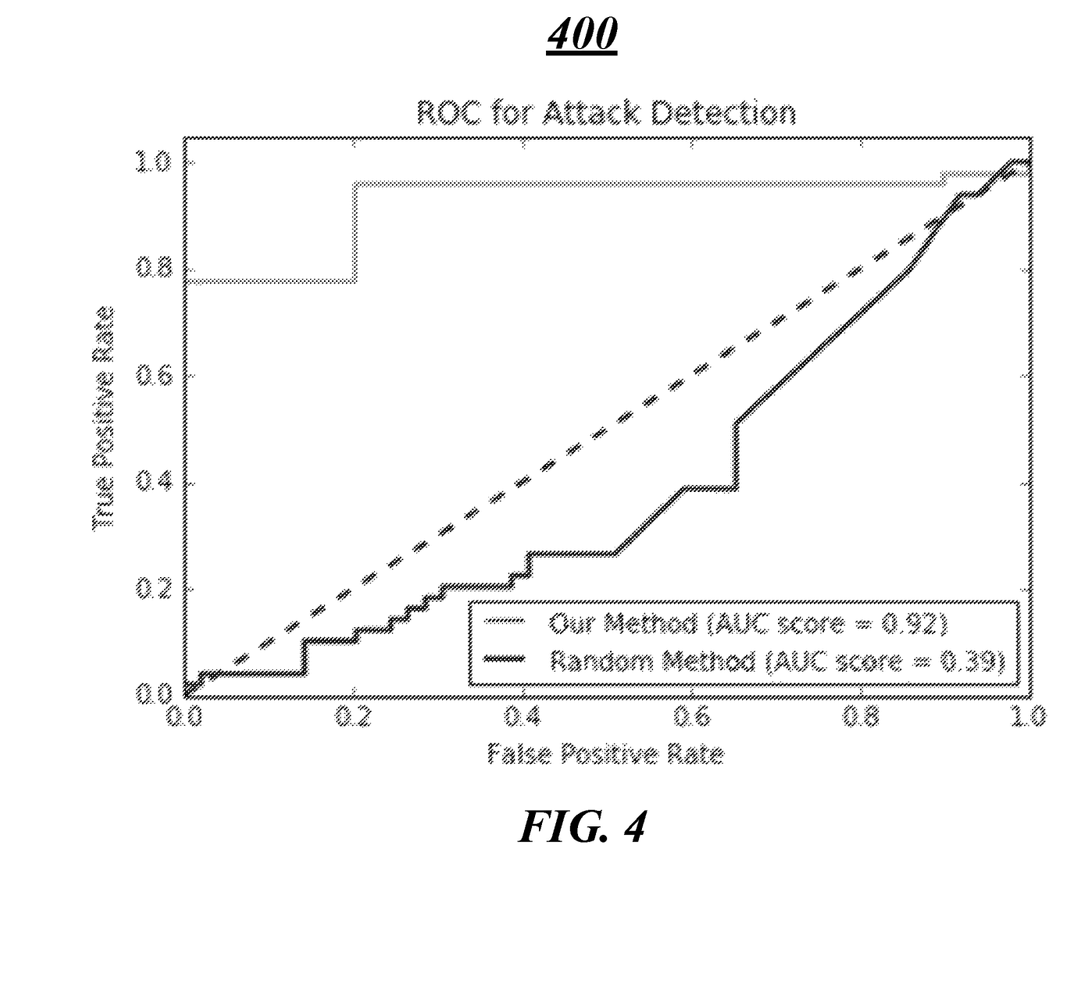
FIG. 4 illustrates an example of a plot.

FIG. 4 illustrates plot 400 including a plot ROC curve with respect to all true positive rate and false positive rate given a certain threshold value. The AUC score is calculated as the area under the ROC curve. If the curve convex toward to the upper left, like embodiments discussed herein, the actor agent would have higher AUC score and can achieve high true positive rates at certain low false positive rates. That is, the critic agent network can effectively detect the attack. If the curve convex toward to the lower right, like illustrated in the random case, the actor agent would have lower AUC score and can only achieve low true positive rate with the high false positive rate. As shown in the FIG. 4, utilizing embodiments discussed herein can achieve a 92% AUC score which is better than the random result with a 39% AUC score.

Figure 5:
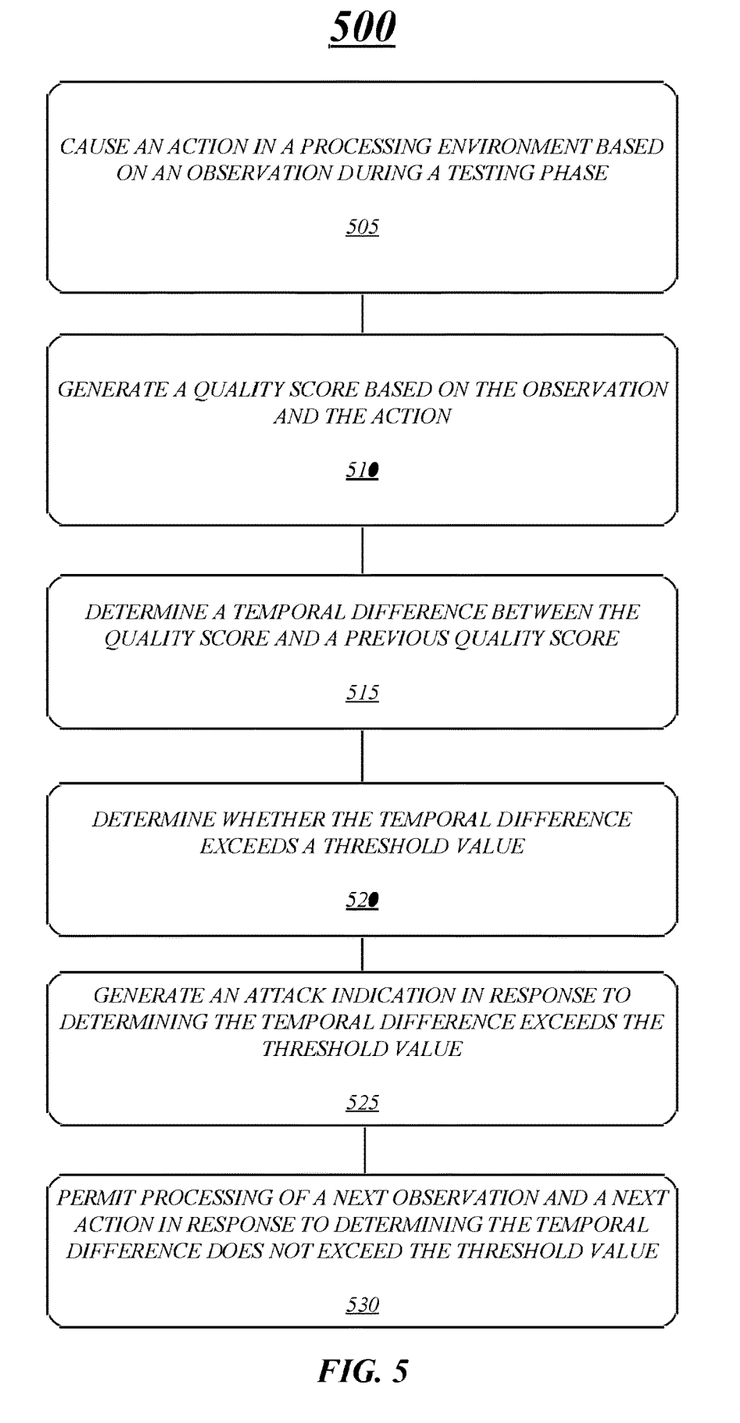
FIG. 5 illustrates an example of a first logic flow.

FIG. 5 illustrates an example embodiment of a first logic flow 500. The logic flow 500 may be representative of some or all of the operations executed by one or more embodiments described herein. For example, the logic flow 500 may illustrate operations performed by system 100 including processing circuitry and memory.

The logic flow 500 includes causing an action in a processing environment based on an observation during a testing phase at block 505. More specifically, an actor agent may send an action to a processing environment that may process and perform the action. The processing environment may generate an observation and a reward based on the action.

In some embodiments, the logic flow 500 includes generating a quality score based on the observation and the action at block 510. In embodiments, the quality score is based on the observation-action pair a sequence of quality scores are highly correlated with the attacks. Thus, the quality scores can be used to detect attacks. More specifically and at blocks 515 and 520, the logic flow 500 includes determining a temporal difference between the quality score and a previous quality score and determining whether the temporal difference exceeds a threshold value. At block 525, the logic flow 500 includes generating an attack indication in response to determining the temporal difference exceeds the threshold value and/or at block 530 permits processing of a next observation and a next action in response to determining the temporal difference does not exceed the threshold value.

Figure 6:
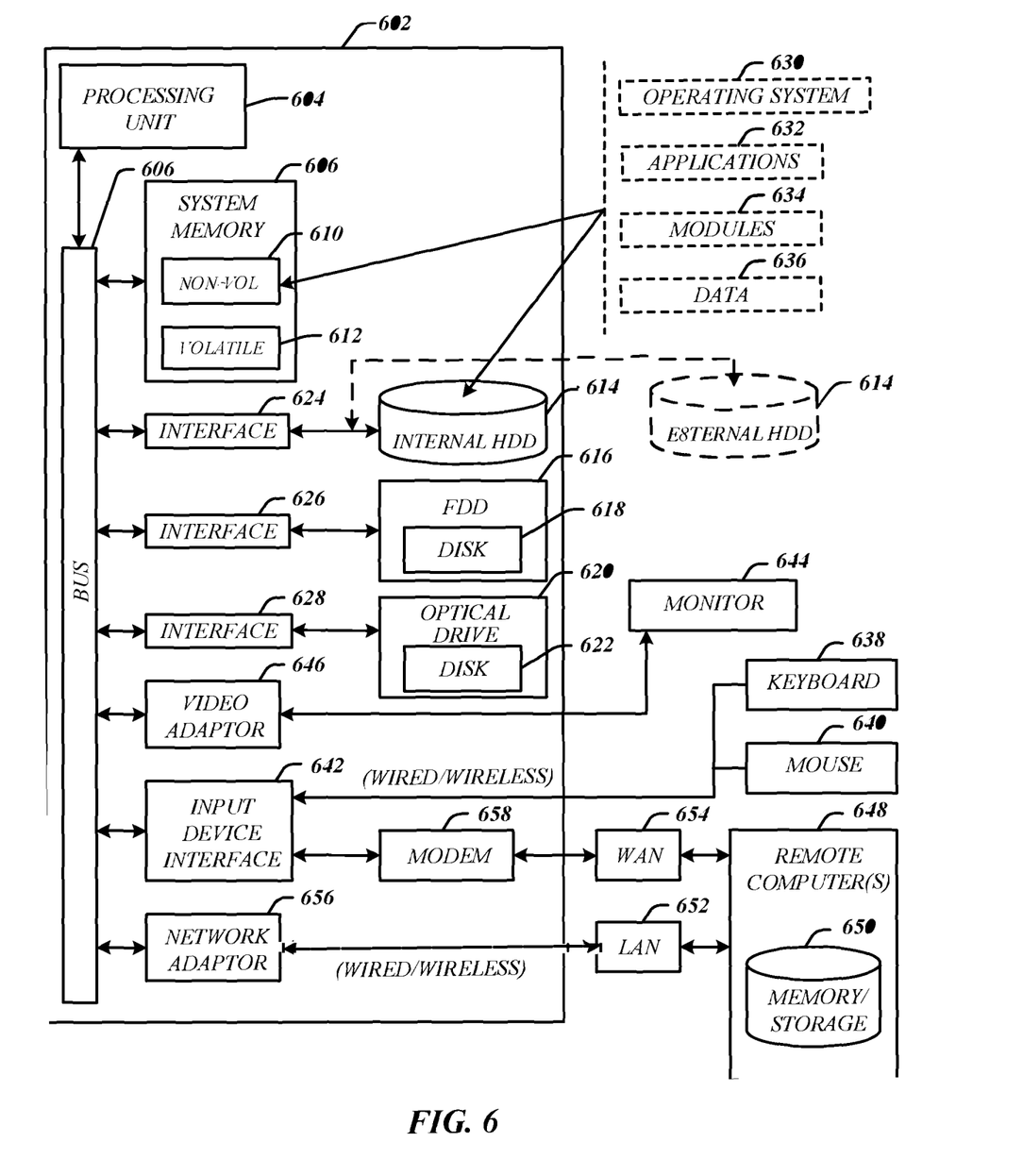
FIG. 6 illustrates an exemplary embodiment of a first computing architecture.

FIG. 6 illustrates an embodiment of an exemplary computing architecture 600 suitable for implementing various embodiments as previously described. In one embodiment, the computing architecture 600 may include or be implemented as part of system 100.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 includes a processing unit 604, a system memory 606 and a system bus 608. The processing unit 604 can be any of various commercially available processors.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 700.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 602 family of standards, such as wireless devices operatively disposed in wireless communication (e.g., IEEE 602.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 602.118 (a, b, g, n, etc.) to provide secure, reliable, fast wireless connectivity. A Wi-Fi network can be used to connect computers to each other, to the Internet, and to wire networks (which use IEEE 602.3-related media and functions).

The various elements of the devices as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-five provided below are intended to be exemplary and non-limiting.

In a first example, embodiments may include a system, a device, an apparatus, and so forth including memory to store instructions, and processing circuitry coupled with the memory. Embodiments also include an actor agent, executable by the processing circuitry, to cause an action in a processing environment based on an observation during a testing phase, and a critic agent, executable by the processing circuitry, to generate a quality score based on the observation and the action caused by the actor agent during the testing phase. Embodiments also include a temporal difference detector, executable by the processing circuitry to determine a temporal difference between the quality score and a previous quality score based on a previous observation and a previous action, determine whether the temporal difference exceeds a threshold value, generate an attack indication in response to determining the temporal difference exceeds the threshold value, and permit processing of a next observation and a next action in response to determining the temporal difference does not exceed the threshold value.

In a second example and furtherance of the first example, embodiments include processing wherein the attack indication to indicate an occurrence of an attack via an input in the processing environment, the attack including one or more of a Fast Gradient Sign Method (FGSM) attack and a random attack.

In a third example and furtherance of any previous example, embodiments include the actor agent to cause a series of actions including the action and the previous action, and the critic agent to determine a sequence of quality scores based on each action of the series of actions and an associated observation for each action.

In a fourth example and furtherance of any previous example, embodiments include the critic agent to determine temporal differences between quality scores of consecutive actions of the series of actions and the associated observations.

In a fifth example and furtherance of any previous example, embodiments include the critic agent to determine whether each of the temporal differences exceeds the threshold value, permit the actor agent to cause a next action in the processing environment in response to determining a temporal difference of the temporal differences does not exceed the threshold value, and generate an attack indication and prohibit the actor agent from causing a next action, in response to determining a temporal difference of the temporal differences exceeds the threshold value.

In a sixth example and furtherance of any previous example, embodiments include the critic agent to perform a training phase prior to generating the quality score and generating the quality score during the testing phase In a seventh example and furtherance of any previous example, embodiments include the critic agent to train the actor agent during the training phase using temporal difference learning.

In an eighth example and furtherance of any previous example, embodiments include one or more sensor devices to generate data for the processing environment, the sensor devices including at least one of a camera, a laser range finder, a radio detection and ranging (RADAR) device, a global positioning system (GPS) device, an ultrasonic device, a sound detection and ranging (SONAR) device, an altimeter, a gyroscope, a tachymeter, and an accelerometer.

In a ninth example and furtherance of any previous example, embodiments include a storage to store a sequence of quality scores including the quality score, each quality score of the sequence of quality scores utilized to determine a temporal difference.

In a tenth example and furtherance of any previous example, embodiments include a computer-implemented method, including generating a quality score based on an observation and an action caused by an actor agent during a testing phase, the action performed in a processing environment based on the observation, determining a temporal difference between the quality score and a previous quality score based on a previous observation and a previous action, determining whether the temporal difference exceeds a threshold value; generating an attack indication in response to determining the temporal difference exceeds the threshold value; and permitting processing of a next observation and a next action in response to determining the temporal difference does not exceed the threshold value.

In an eleventh example and furtherance of any previous example, embodiments include a computer-implemented method, including processing the attack indication indicates an occurrence of an attack via an input in the processing environment, the attack including one or more of a Fast Gradient Sign Method (FGSM) attack and a random attack.

In a twelfth example and furtherance of any previous example, embodiments include a computer-implemented method, including causing a series of actions including the action and the previous action, and determining a sequence of quality scores based on each action of the series of actions and an associated observation for each action.

In a thirteenth example and furtherance of any previous example, embodiments include a computer-implemented method, including determining temporal differences between quality scores of consecutive actions of the series of actions and the associated observations.

In a fourteenth example and furtherance of any previous example, embodiments include a computer-implemented method, including determining whether each of the temporal differences exceeds the threshold value, permitting a next action in the processing environment in response to determining a temporal difference of the temporal differences does not exceed the threshold value, and generating an attack indication and prohibiting a next action, in response to determining a temporal difference of the temporal differences exceeds the threshold value.

In a fifteenth example and furtherance of any previous example, embodiments include a computer-implemented method, including performing a training phase prior to generating the quality score and generating the quality score during the testing phase.

In a sixteenth example and furtherance of any previous example, embodiments include a computer-implemented method, including performing the training during the training phase using temporal difference learning.

In a seventeenth example and furtherance of any previous example, embodiments include a computer-implemented method, including receiving data from one or more sensor devices in the processing environment, the sensor devices including at least one of a camera, a laser range finder, a radio detection and ranging (RADAR) device, a global positioning system (GPS) device, an ultrasonic device, a sound detection and ranging (SONAR) device, an altimeter, a gyroscope, a tachymeter, and an accelerometer.

In an eighteenth example and furtherance of any previous example, embodiments A non-transitory machine-readable medium containing instructions, which when executed by a processor, cause the processor to perform operations, the operations to generate a quality score based on an observation and an action caused by an actor agent during a testing phase, the action performed in a processing environment based on the observation, determine a temporal difference between the quality score and a previous quality score based on a previous observation and a previous action, determine whether the temporal difference exceeds a threshold value, generate an attack indication in response to determining the temporal difference exceeds the threshold value, and permit processing of a next observation and a next action in response to determining the temporal difference does not exceed the threshold value.

In a nineteenth example and furtherance of any previous example, embodiments include processing the attack indication indicates an occurrence of an attack via an input in the processing environment, the attack including one or more of a Fast Gradient Sign Method (FGSM) attack and a random attack.

In a twentieth example and furtherance of any previous example, embodiments include cause a series of actions including the action and the previous action, and determine a sequence of quality scores based on each action of the series of actions and an associated observation for each action.

In a twenty-first example and furtherance of any previous example, embodiments include operations to determine temporal differences between quality scores of consecutive actions of the series of actions and the associated observations.

In a twenty-second example and furtherance of any previous example, embodiments include operations to determine whether each of the temporal differences exceeds the threshold value, permit a next action in the processing environment in response to determining a temporal difference of the temporal differences does not exceed the threshold value, and generate an attack indication and prohibiting a next action, in response to determining a temporal difference of the temporal differences exceeds the threshold value.

In a twenty-third example and furtherance of any previous example, embodiments include operations to perform a training phase prior to generating the quality score and generating the quality score during the testing phase.

In a twenty-fourth example and furtherance of any previous example, embodiments include operations to perform the training during the training phase using temporal difference learning.

In a twenty-fifth example and furtherance of any previous example, embodiments include operations to receive data from one or more sensor devices in the processing environment, the sensor devices including at least one of a camera, a laser range finder, a radio detection and ranging (RADAR) device, a global positioning system (GPS) device, an ultrasonic device, a sound detection and ranging (SONAR) device, an altimeter, a gyroscope, a tachymeter, and an accelerometer.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
memory to store instructions; and
processing circuitry coupled with the memory, the processing circuitry to:
generate a quality score based on an observation and an action, the action performed in a processing environment based on the observation;
determine a temporal difference between the quality score and a previous quality score based on a previous observation and a previous action;
determine whether the temporal difference exceeds a threshold value;
generate an attack indication when the temporal difference exceeds the threshold value; and
permit processing of a next observation and a next action when the temporal difference does not exceed the threshold value.

2. The apparatus of claim 1, wherein the attack indication to indicate an occurrence of an attack via an input in the processing environment, the attack comprising one or more of a Fast Gradient Sign Method (FGSM) attack and a random attack.

3. The apparatus of claim 1, comprising an actor agent to cause a series of actions including the action and the previous action, and a critic agent to determine a sequence of quality scores based on each action of the series of actions and an associated observation for each action.

4. The apparatus of claim 3, the critic agent to determine temporal differences between quality scores of consecutive actions of the series of actions and the associated observations.

5. The apparatus of claim 4, the critic agent to:
determine whether each of the temporal differences exceeds the threshold value;
permit the actor agent to cause a next action in the processing environment in response to determining a temporal difference of the temporal differences does not exceed the threshold value; and
generate an attack indication and prohibit the actor agent from causing a next action, in response to determining a temporal difference of the temporal differences exceeds the threshold value.

6. The apparatus of claim 1, a critic agent to perform a training phase prior to generating the quality score and generating the quality score during a testing phase.

7. The apparatus of claim 6, the critic agent to train an actor agent during the training phase using temporal difference learning.

8. The apparatus of claim 1, comprising one or more sensor devices to generate data for the processing environment, the sensor devices comprising a camera, a laser range finder, a radio detection and ranging (RADAR) device, a global positioning system (GPS) device, an ultrasonic device, a sound detection and ranging (SONAR) device, an altimeter, a gyroscope, a tachymeter, or an accelerometer.

9. The apparatus of claim 1, comprising a storage to store a sequence of quality scores including the quality score, each quality score of the sequence of quality scores utilized to determine a temporal difference.

10. A computer-implemented method, comprising:
generating a quality score based on an observation and an action, the action performed in a processing environment based on the observation;
determining a temporal difference between the quality score and a previous quality score based on a previous observation and a previous action;
determining whether the temporal difference exceeds a threshold value;
generating an attack indication when the temporal difference exceeds the threshold value; and
permit processing of a next observation and a next action when the temporal difference does not exceed the threshold value.

11. The computer-implemented method of claim 10, wherein the attack indication indicates an occurrence of an attack via an input in the processing environment, the attack comprising one or more of a Fast Gradient Sign Method (FGSM) attack and a random attack.

12. The computer-implemented method of claim 10, comprising:
causing a series of actions including the action and the previous action; and
determining a sequence of quality scores based on each action of the series of actions and an associated observation for each action.

13. The computer-implemented method of claim 12, comprising determining temporal differences between quality scores of consecutive actions of the series of actions and the associated observations.

14. The computer-implemented method of claim 13, comprising:
determining whether each of the temporal differences exceeds the threshold value;
permitting a next action in the processing environment in response to determining a temporal difference of the temporal differences does not exceed the threshold value; and
generating an attack indication and prohibiting a next action, in response to determining a temporal difference of the temporal differences exceeds the threshold value.

15. The computer-implemented method of claim 10, comprising performing a training phase prior to generating the quality score and generating the quality score during a testing phase.

16. The computer-implemented method of claim 15, comprising performing the training during the training phase using temporal difference learning.

17. The computer-implemented method of claim 10, comprising receiving data from one or more sensor devices in the processing environment, the sensor devices comprising a camera, a laser range finder, a radio detection and ranging (RADAR) device, a global positioning system (GPS) device, an ultrasonic device, a sound detection and ranging (SONAR) device, an altimeter, a gyroscope, a tachymeter, or an accelerometer.

18. A non-transitory machine-readable medium containing instructions, which when executed by a processor, cause the processor to perform operations, the operations to:
generate a quality score based on an observation and an action, the action performed in a processing environment based on the observation;
determine a temporal difference between the quality score and a previous quality score based on a previous observation and a previous action;
determine whether the temporal difference exceeds a threshold value;
generate an attack indication when the temporal difference exceeds the threshold value; and
permit processing of a next observation and a next action when the temporal difference does not exceed the threshold value.

19. The machine-readable medium of claim 18, wherein the attack indication indicates an occurrence of an attack via an input in the processing environment, the attack comprising one or more of a Fast Gradient Sign Method (FGSM) attack and a random attack.

20. The machine-readable medium of claim 18, wherein the operations further comprise operations to:
cause a series of actions including the action and the previous action; and
determine a sequence of quality scores based on each action of the series of actions and an associated observation for each action.

21. The machine-readable medium of claim 20, wherein the operations further comprise operations to determine temporal differences between quality scores of consecutive actions of the series of actions and the associated observations.

22. The machine-readable medium of claim 21, wherein the operations further comprise operations to:
determine whether each of the temporal differences exceeds the threshold value;
permit a next action in the processing environment in response to determining a temporal difference of the temporal differences does not exceed the threshold value; and
generate an attack indication and prohibiting a next action, in response to determining a temporal difference of the temporal differences exceeds the threshold value.

23. The machine-readable medium of claim 18, wherein the operations further comprise operations to perform a training phase prior to generating the quality score and generating the quality score during a testing phase.

24. The machine-readable medium of claim 23, wherein the operations further comprise operations to perform the training during the training phase using temporal difference learning.

25. The machine-readable medium of claim 18, wherein the operations further comprise operations to receive data from one or more sensor devices in the processing environment, the sensor devices comprising a camera, a laser range finder, a radio detection and ranging (RADAR) device, a global positioning system (GPS) device, an ultrasonic device, a sound detection and ranging (SONAR) device, an altimeter, a gyroscope, a tachymeter, or an accelerometer.

* * * * *